United States Patent
Spiegel

(10) Patent No.: US 11,117,518 B2
(45) Date of Patent: Sep. 14, 2021

(54) METHOD FOR DETECTING AN OBSTACLE BY MEANS OF REFLECTED ULTRASONIC WAVES

(71) Applicant: Elmos Semiconductor AG, Dortmund (DE)

(72) Inventor: Egbert Spiegel, Marl (DE)

(73) Assignee: ELMOS SEMICONDUCTOR SE, Dortmund (DE)

(*) Notice: Subject to any disclaimer, the term of this patent is extended or adjusted under 35 U.S.C. 154(b) by 0 days.

(21) Appl. No.: 16/429,113

(22) Filed: Jun. 3, 2019

(65) Prior Publication Data

US 2019/0366922 A1  Dec. 5, 2019

(30) Foreign Application Priority Data

Jun. 5, 2018 (EP) .................................... 18176088

(51) Int. Cl.
*B60Q 9/00* (2006.01)
*G01S 7/527* (2006.01)
*G01S 15/931* (2020.01)

(52) U.S. Cl.
CPC .............. *B60Q 9/006* (2013.01); *G01S 7/527* (2013.01); *G01S 15/931* (2013.01); *G01S 2015/932* (2013.01)

(58) Field of Classification Search
CPC ....... B60Q 9/006; G01S 7/527; G01S 15/931; G01S 2015/932
See application file for complete search history.

(56) References Cited

U.S. PATENT DOCUMENTS

| | | | | | |
|---|---|---|---|---|---|
| 3,407,649 A | * | 10/1968 | Dickinson, III | ..... | G01N 29/043 73/596 |
| 4,605,314 A | * | 8/1986 | Stenmark | .................. | G01J 5/60 374/124 |
| 4,835,519 A | * | 5/1989 | Suzaki | ..................... | G01S 15/04 340/538 |

(Continued)

FOREIGN PATENT DOCUMENTS

| | | | | |
|---|---|---|---|---|
| DE | 19846241 A1 | 4/2000 | | |
| DE | 10027828 A1 | 12/2001 | | |
| JP | 357039346 A | * 3/1982 | ............. | G01N 29/46 |

*Primary Examiner* — Hai Phan
*Assistant Examiner* — Son M Tang
(74) *Attorney, Agent, or Firm* — Mindful IP PLLC

(57) ABSTRACT

A method for detecting an obstacle utilizing reflected ultrasonic waves, comprises transmitting an ultrasonic burst transmission signal by an ultrasonic transmitter to a detection area to be observed and receiving an ultrasonic signal reflected by an obstacle in the detection area by an ultrasonic receiver as an ultrasonic reception signal. In the ultrasonic reception signal at least one echo is detected resulting from an obstacle. The echo section of the ultrasonic reception signal belonging to the echo is transformed from the time domain into the frequency domain. The frequency spectrum of the echo section is then examined for the presence of at least one of a plurality of predetermined spectral characteristics, wherein each spectral characteristic is representative of a predetermined obstacle type or a plurality of predetermined obstacle types. The echo section is allocated to a predetermined obstacle type based on the examination.

18 Claims, 3 Drawing Sheets

(56) References Cited

U.S. PATENT DOCUMENTS

Figure 1:
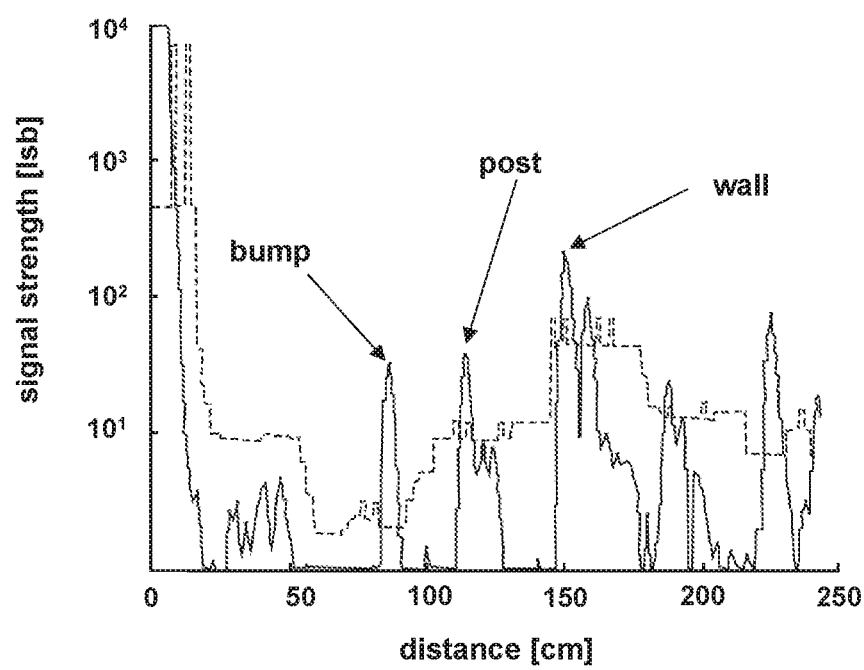

| | | | | |
|---|---|---|---|---|
| 6,279,396 B1* | 8/2001 | Imagawa | G01S 7/524 | |
| | | | 73/1.79 | |
| 6,377,205 B1* | 4/2002 | Eckersten | G01S 13/931 | |
| | | | 342/90 | |
| 6,380,884 B1* | 4/2002 | Satou | G01S 13/48 | |
| | | | 342/70 | |
| 6,518,916 B1* | 2/2003 | Ashihara | G01S 7/412 | |
| | | | 342/70 | |
| 6,522,286 B1* | 2/2003 | Ashihara | G01S 13/003 | |
| | | | 342/70 | |
| 7,356,408 B2* | 4/2008 | Tsuchiya | G08G 1/165 | |
| | | | 340/937 | |
| 7,481,769 B2* | 1/2009 | Karasawa | A61B 8/0858 | |
| | | | 600/437 | |
| 8,493,198 B1* | 7/2013 | Vasquez | B60Q 9/008 | |
| | | | 340/425.5 | |
| 8,525,728 B2* | 9/2013 | Lundmark | B60R 21/0134 | |
| | | | 342/435 | |
| 8,542,106 B2* | 9/2013 | Hilsebecher | G01S 13/931 | |
| | | | 340/435 | |
| 8,594,370 B2* | 11/2013 | Schamp | B60R 21/0134 | |
| | | | 382/103 | |
| 8,669,858 B2* | 3/2014 | Yoshino | B60Q 9/00 | |
| | | | 340/466 | |
| 8,731,816 B2* | 5/2014 | Dintzer | G01S 13/931 | |
| | | | 701/301 | |
| 8,768,007 B2* | 7/2014 | Schamp | G06K 9/00201 | |
| | | | 382/103 | |
| 8,907,839 B2* | 12/2014 | Oh | G06K 9/6293 | |
| | | | 342/52 | |
| 9,342,986 B2* | 5/2016 | Dariush | G08G 1/166 | |
| 9,488,725 B2* | 11/2016 | Max | G01S 15/878 | |
| 2003/0144838 A1* | 7/2003 | Allegro | G10L 21/0208 | |
| | | | 704/233 | |
| 2005/0180530 A1* | 8/2005 | Reiche | G01S 7/52004 | |
| | | | 375/317 | |
| 2006/0115113 A1* | 6/2006 | Lages | G01S 17/931 | |
| | | | 382/103 | |
| 2007/0024431 A1* | 2/2007 | Touge | B60Q 9/00 | |
| | | | 340/436 | |
| 2008/0157940 A1* | 7/2008 | Breed | G06F 3/0238 | |
| | | | 340/425.5 | |
| 2010/0097200 A1* | 4/2010 | Hilsebecher | G01S 7/412 | |
| | | | 340/436 | |
| 2010/0242611 A1* | 9/2010 | Terazawa | G01S 15/931 | |
| | | | 73/629 | |
| 2011/0137527 A1* | 6/2011 | Simon | B60R 1/00 | |
| | | | 701/45 | |
| 2012/0099732 A1* | 4/2012 | Visser | G10L 21/0272 | |
| | | | 381/17 | |
| 2012/0170812 A1* | 7/2012 | Kamiyama | B60R 1/00 | |
| | | | 382/103 | |
| 2012/0314541 A1* | 12/2012 | Matsuura | G01S 15/108 | |
| | | | 367/94 | |
| 2012/0327239 A1* | 12/2012 | Inoue | G01S 15/931 | |
| | | | 348/148 | |
| 2013/0311083 A1* | 11/2013 | Mikami | G01S 15/876 | |
| | | | 701/428 | |
| 2015/0097713 A1* | 4/2015 | Nakai | G01S 13/06 | |
| | | | 342/27 | |
| 2015/0145995 A1* | 5/2015 | Shahraray | H04W 4/70 | |
| | | | 348/148 | |
| 2016/0084958 A1* | 3/2016 | Kim | G01S 15/102 | |
| | | | 367/96 | |
| 2016/0202355 A1* | 7/2016 | Liu | G01S 7/411 | |
| | | | 342/70 | |
| 2016/0325757 A1* | 11/2016 | Westlund | G05D 1/0088 | |
| 2017/0343649 A1* | 11/2017 | Suhre | G01S 7/497 | |
| 2017/0356999 A1* | 12/2017 | Xie | G01S 15/93 | |
| 2018/0005528 A1* | 1/2018 | Loeillet | G08G 1/165 | |
| 2018/0067966 A1* | 3/2018 | Oder | G01S 13/865 | |
| 2018/0118197 A1* | 5/2018 | Kim | B60W 30/06 | |
| 2018/0162665 A1* | 6/2018 | Fukusaka | B65H 7/12 | |
| 2018/0259644 A1* | 9/2018 | Kim | G08G 1/161 | |
| 2019/0250263 A1* | 8/2019 | Watanabe | B60P 1/04 | |
| 2019/0346563 A1* | 11/2019 | Sugae | G01S 7/527 | |

* cited by examiner

METHOD FOR DETECTING AN OBSTACLE BY MEANS OF REFLECTED ULTRASONIC WAVES

CROSS-REFERENCE TO RELATED APPLICATIONS

This application claims priority to European Patent Application No. 18 176 088.5, filed on Jun. 5, 2018, which application is hereby incorporated herein by reference in its entirety.

The disclosure relates to a method for detecting an obstacle by means of reflected ultrasonic waves, wherein this method is particularly used as a parking assistance for vehicles. In particular, the disclosure relates to a method for detecting the type of an obstacle particularly in the vicinity of a vehicle.

The method of detecting an obstacle particularly in the vicinity of a vehicle by means of analyzing the received echo signal of previously transmitted ultrasonic waves is generally known. Such methods have proven to be effective for automotive applications, for example as a parking assistance. So far, the temporal course of the echo signal has been analyzed in most cases. Characteristic time courses, such as more or less distinctive maxima and the time course of the echo signal before and after a maximum, are regarded as obstacles.

Currently, it is not possible to distinguish between different obstacle types by means of static measurement. Only the course of the echo signal can be tracked with regard to echo signal sections that can be traced back to obstacles. The fact that the distinction of different obstacle types can be relevant is shown by the example of a stopper, i.e. a bump as used particularly on parking lots to signalize to the driver while parking how far he or she should drive into the parking space (namely until the front or rear wheels contact the stopper). During the parking process, such an obstacle initially shows a relatively large echo whose size, however, strongly decreases with increasing approximation. It is also possible to drive over such a bump, which also includes curbs. However, the amplitude of an obstacle that can be traced back to a higher obstacle, such as a wall or a vehicle, always substantially remains the same. This also applies to piles and posts.

Methods for using reflected ultrasonic waves are known, for example, from DE-A-100 27 828 and DE-A-198 46 241.

The object of the disclosure is to provide a method for detecting an obstacle by means of reflected ultrasonic waves, by means of which different obstacle types can be distinguished.

In order to solve this object, a method for detecting an obstacle by means of reflected ultrasonic waves is proposed, in particular as a parking assistance for vehicles, wherein the method comprises:

transmitting an ultrasonic burst transmission signal by means of an ultrasonic transmitter to a detection area to be observed;

receiving an ultrasonic signal reflected by an obstacle in the detection area by means of an ultrasonic receiver as an ultrasonic reception signal detecting at least one echo in the ultrasonic reception signal resulting from the obstacle;

transforming the echo section of the ultrasonic reception signal belonging to the echo from the time domain into the frequency domain;

examining the frequency spectrum of the echo section for the presence of at least one of a plurality of predetermined spectral characteristics, wherein each spectral characteristic is representative of a predetermined obstacle type and possibly of at least one of a plurality of predetermined obstacle types; and allocating the echo section to a predetermined obstacle type.

Correspondingly, it is proposed to take advantage of the knowledge of acoustic imaging of obstacles by transmitting ultrasonic waves and receiving reflections of these ultrasonic waves in order to be able to distinguish between different obstacles, which are located in particular in the vicinity of a vehicle during the parking process. This is insofar an advantage as, for example, a stopper or another type of bump should be distinguished as an obstacle from, for example, a wall, since it is possible to "drive over" a bump or a curb during a parking process, unlike a wall; this of course does not apply, for example, to an adjacent parked vehicle. A problem is that is it not possible or not reliably possible to distinguish different obstacle types, for example, during a parking process by means of the envelop signal or the time course of the echo signal.

Disclosed is a method to distinguish between obstacles by examining echo sections of the ultrasonic reception signal in the frequency domain. As could be determined, it is possible to verify the obstacle type by determining the spectral moments such as the spectral center of gravity and the spectral width of the frequency spectrum of an echo section.

In the method according to the disclosure, an ultrasonic transmitter transmits an ultrasonic burst transmission signal to an adjacent detection area. From this detection area, the ultrasonic receiver receives the reflected ultrasonic signal as an ultrasonic reception signal if there is an obstacle in the detection area. At least one echo section that can be traced back to an obstacle can be detected by means of the ultrasonic reception signal respectively by means of its time course. This is done, for example, by comparing the signal size of the ultrasonic reception signal to a threshold value that is fixed or is dynamically adaptable. According to the disclosure, a detected echo section is transformed from the time domain into the frequency domain. The frequency spectrum of the echo section is examined for the presence of at least one of a plurality of predetermined spectral characteristics, wherein each spectral characteristic is representative of a predetermined obstacle type. However, it is also possible that each spectral characteristic is representative of more than of a plurality of predetermined obstacle types. The echo section is then allocated to a predetermined obstacle type, wherein the point in time in which the echo section appears in the ultrasonic reception signal is representative of the distance of the obstacle to the ultrasonic receiver. According to the disclosure, the ultrasonic transmitter and the ultrasonic receiver can be two different units or a common unit, namely a so-called ultrasonic transducer.

In a further example of the disclosure it may be provided that a degree of probability is specified with which an echo section is to be allocated to an obstacle type, or that several probabilities are specified with which an echo section is to be allocated to different obstacle types. In this further example, additional information, namely the probability or probability density distribution, indicates the reliability with which an obstacle type or, if applicable, different obstacle types can be allocated to a detected echo section.

It may further be expedient if a detected obstacle is signalized optically and/or acoustically and/or tactilely (e.g. seat or steering wheel of a vehicle), wherein the signals are different for predetermined obstacle types. In this way, the obstacle type is signalized to the driver parking his vehicle.

As aforementioned, the spectral characteristics include the spectral center of gravity and the spectral width of the frequency spectrum of an echo section. These two spectral characteristics can be determined in a common way from the I and Q signal portions of an I/Q demodulation. In the course of the development of the disclosure, it has been shown that particularly three different obstacle types can be distinguished by means of spectral characteristics. The different types of distinguishable obstacles comprise as a first type a curb, a stopper or other bumps, as a second type a wall and particularly a vehicle, and as a third type a post or a pile such as for information and traffic signs, traffic lights or street lights. It has been shown that a bump can be unambiguously distinguished from a wall and a post by means of the spectral center of gravity of an echo section. However, the distinction between a wall and a post by means of the spectral center of gravity may not be unambiguous. In contrast, however, a wall can be unambiguously distinguished from a bump and a post if the echo section is examined with regard to its spectral width. However, it is barely possible to distinguish between a bump and a post by means of the spectral width. Thus, if both spectral characteristics are used to distinguish the three aforementioned obstacle types, this is very well possible, since these three obstacle types "distribute" themselves within a 2D diagram with the spectral width plotted on one axis and the spectral center of gravity on the other axis on clearly separated areas.

The ultrasonic receivers used today in automotive applications are unfortunately very temperature-dependent. Thus, if ultrasonic receivers are used whose sensitivity is comparatively strongly temperature-dependent, it is advantageous, according to an advantageous further example, if the detection of an echo section and its transformation into the frequency domain is temperature-compensated or temperature-corrected or otherwise carried out by taking into account the current temperature of the ultrasonic receiver. It may be advantageous to determine the temperature of the ultrasonic receiver by measurement or based on a temperature-dependent signal characteristic, with regard to which the ultrasonic receiver is calibrated and for which the ultrasonic reception signal is examined. In this context, reference is made to the German patent application DE 10 2018 102 535.1 dated 5 Feb. 2018, the disclosures of which are hereby incorporated by reference.

It has been proven to be particularly advantageous to use a short pulse signal as an ultrasonic transmission signal in order to detect obstacles. Thus, the maximum spectral range is covered. However, a single pulse or a few pulses have too little energy to be able to detect sufficiently reliable echo signal sections even at distances of a few meters relevant for parking processes. It is thus expedient to use burst transmission signals instead of single pulses. Here, it has proven to be advantageous if the ultrasonic burst transmission signal has one to twenty or five to fifteen or eight to twelve pulses.

In a further example, it may be provided that the transformation into the frequency domain is carried out by means of a Fourier transform, e.g. an FFT, or without performing a Fourier transform by means of an algorithm particularly known from signal processing of a weather radar (see e.g. Doviak, Richard J./Zmić, Dušan S. (1993): "Doppler Radar and Weather Observations" ($2^{nd}$ edition), p. 122-159) such as for example the autocovariance procedure.

As aforementioned, different obstacle types are identified by determining spectral characteristics. By means of known classifiers such as the Gaussian Naive Bayes Classifier, the Nearest Centroid Classifier and the K-nearest Neighbors Classifier (see e.g. Duda, R. O./Hart, P. E./Stork, D. G. (2001): "Pattern Classification", Wiley, 654 pages) or other known procedures of pattern recognition (see e.g. Haykin, S. (1998): "Neural Networks: A Comprehensive Foundation", Prentice Hall, 842 pages; Hastie, T./Tibshirani, R./Friedman, J. (2001): "The Elements of Statistical Learning", Springer, 533 pages; Bishop, C. M. (2005): "Pattern Recognition and Machine Learning", Springer, 738 pages; Rojas, R. (1996): "Theorie der neuronalen Netze", Springer, approx. 300 pages) the obstacle type can finally be determined respectively the probability can be specified with which an obstacle can be allocated to one of a plurality of predetermined obstacle types.

Figure 2:
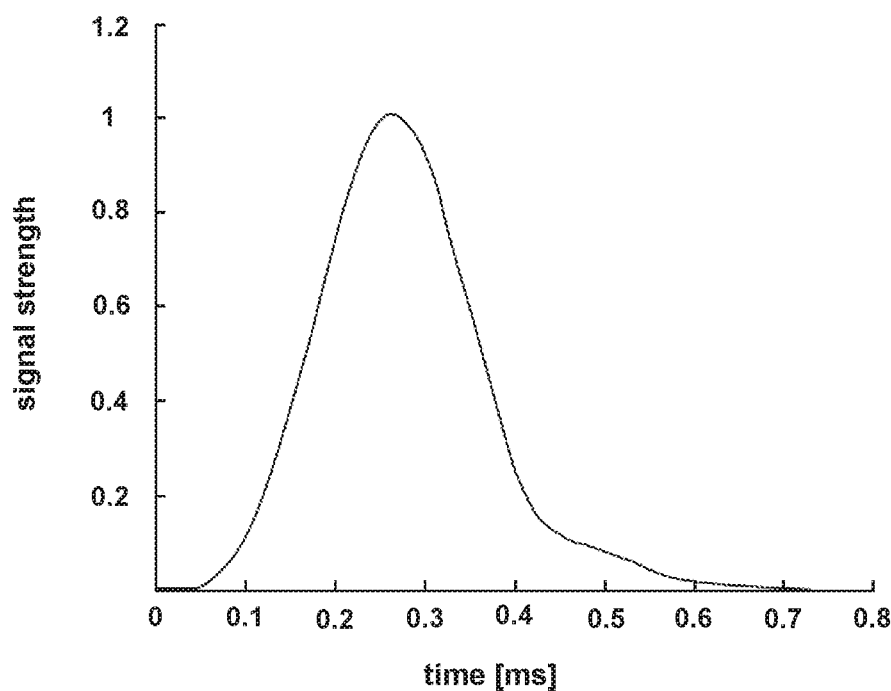
Figure 3:
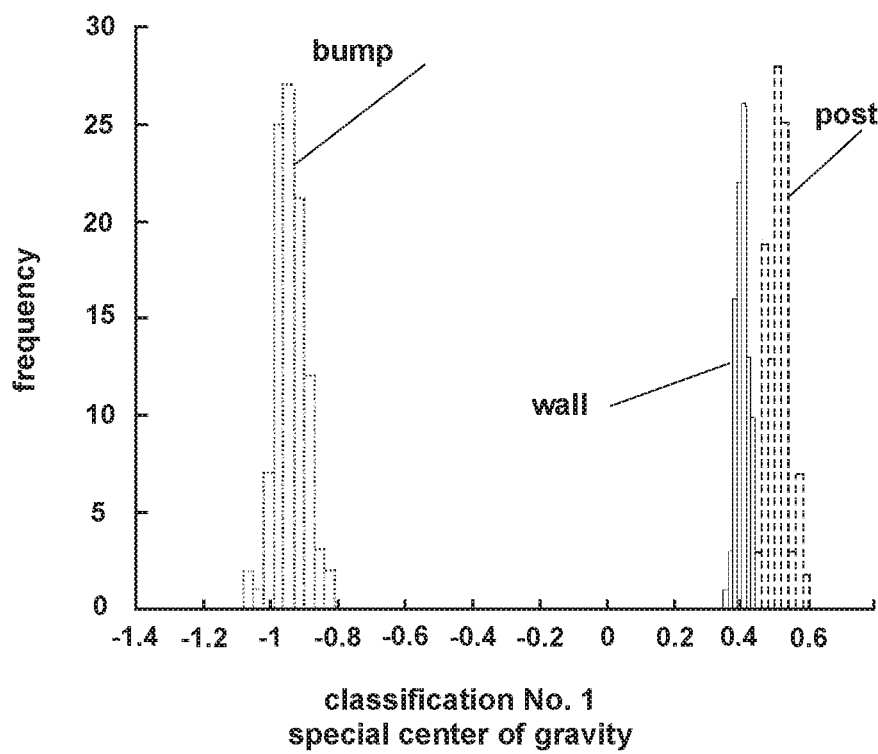
Figure 4:
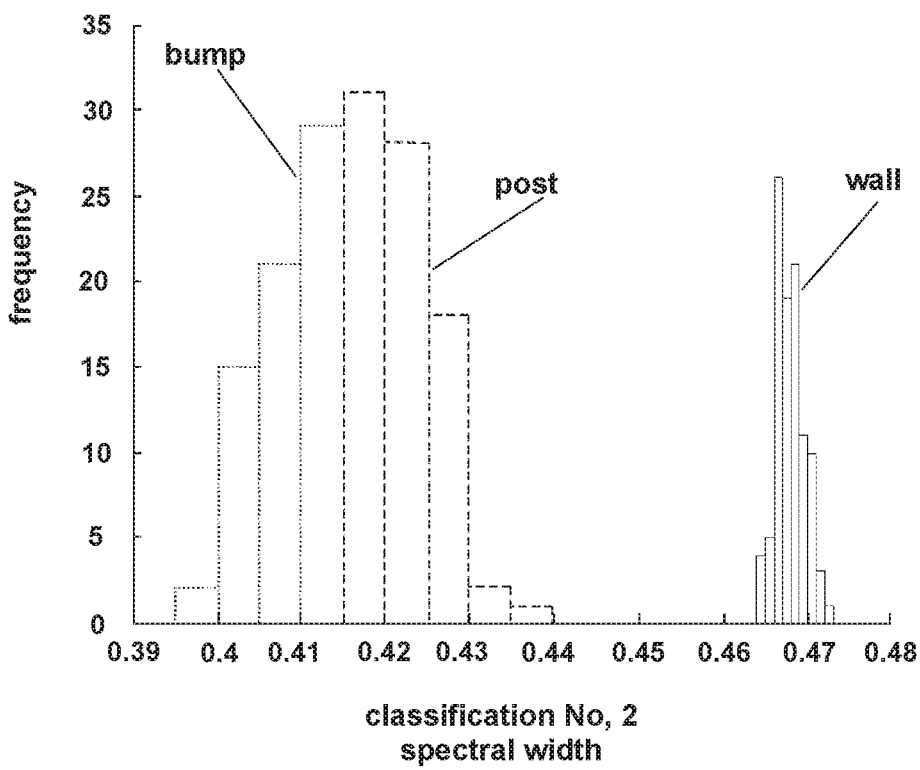
Figure 5:
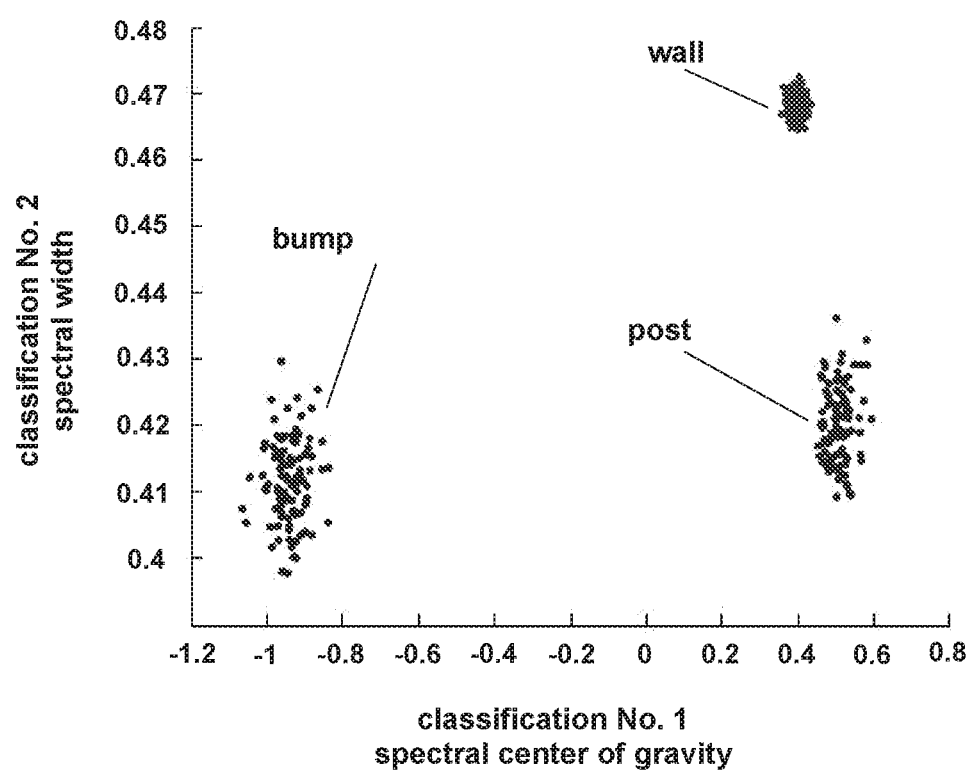

In the following, the disclosure is described in detail with reference to the drawings. The individual figures show the following:

FIG. 1 an example time course of an ultrasonic reception signal with distinctive echo sections due to a bump approximately 80 cm away from the receiver, with a distinctive echo section due to a post approximately 120 cm away from the ultrasonic receiver, and with a distinctive echo due to a wall approximately 150 cm away from the ultrasonic receiver;

FIG. 2 an example time course of an extracted echo section;

FIG. 3 a diagram in which the spectral center of gravity of an example extracted echo sections is plotted for the obstacles "bump", "wall" and "post" when measuring these obstacles at different distances from the ultrasonic receiver;

FIG. 4 a diagram in which the spectral width of example extracted echo sections is plotted for the obstacles "bump", "wall" and "post" when measuring these obstacles at different distances from the ultrasonic receiver; and FIG. 5 a summary of the diagrams of FIGS. 3 and 4 as a 2D diagram of the aforementioned obstacles to be measured during tests, illustrating that each obstacle type can be distinguished by the location of the two aforementioned spectral characteristics within the 2D diagrams.

As aforementioned, laboratory tests were carried out within the scope of the disclosure, in which ultrasonic burst transmission signals, for example, with 8 pulses were transmitted with an ultrasonic transducer into a detection area in which a post (75 mm tube with a height of 1 m), a simulated standard curb with a length of 1 m and aligned at a right angle with the direction of propagation of the ultrasonic waves, and a wall were located. This scene was measured, whereby for example the time course of the ultrasonic reception signal was determined according to FIG. 1. In FIG. 1, the continuous line represents the ultrasonic reception signal, while the interrupted line represents a threshold signal. Three characteristic echo sections can be seen, namely for the bump (standard curb), for the post and for the wall.

FIG. 2 shows as an example the course of an echo section extracted from the ultrasonic reception signal. It has been proven to be a good compromise in terms of testing to use eight pulses as an ultrasonic burst transmission signal. An echo section is detected by means of the echo maximum. A plurality of samples was selected to the left and to the right of the maximum (exemplary eight samples before and eight samples after the echo maximum). Then, the spectral center of gravity and the spectral width of the extracted echo section were determined. From the literature (e.g. as cited in: Keeler, R. J./Passarelli, R. E. (1990): *Signal Processing for*

*Atmospheric Radars*. In: Atlas, D. (eds.): "Radar in Meteorology", American Meteorological Society, Boston, Mass.), the formula correlations for the spectral center of gravity and the spectral width are known as follows:

1. Classification No. (Spectral Center of Gravity)

$$R(1) = \sum_{m=0}^{M-1} (I_m - jQ_m) \cdot (I_{m+1} + jQ_{m+1})$$

$$S1 = \arctan\left(\frac{\Im(R)}{\Re(R)}\right)$$

2. Classification No. (Spectral Width)

$$R(0) = \sum_{m=0}^{M-1} (I_m - jQ_m) \cdot (I_m + jQ_m)$$

$$S2 = \sqrt{1 - \left|\frac{R(1)}{R(0)}\right|}$$

FIGS. 3 and 4 show the "distribution" of the different measurement results after calculation of the spectral centers of gravity and the spectral widths of the echo signals sections for the stopper, the post and the wall. FIG. 3 shows that a stopper can be distinguished from a wall and a post by means of the spectral center of gravity, wherein the two obstacle types wall and post cannot unambiguously be distinguished from one another. In contrast, FIG. 4 shows that the spectral width can be used to distinguish a wall as an obstacle from a stopper and a post, whereas a stopper and a post cannot be distinguished from one another.

FIG. 5 finally shows that all three obstacle types can be well distinguished from one another when considering both spectral parameters.

Thus, once these preliminary examinations have been carried out and field tests are subsequently carried out, it can be seen that the determination of the two spectral characteristics "spectral center of gravity" and "spectral width" makes it possible to allocate an obstacle to one of the three aforementioned types. The actual measurement point from spectral center of gravity and spectral width of an echo section to be measured is finally allocated to one of the three obstacle classes based on known classifiers. The probability with which a currently measured obstacle can be allocated to one of the three classes can then also be specified. Alternatively, it is also possible to specify several probabilities in order to specify the allocation probabilities of an obstacle to several classes.

The invention claimed is:

1. A method for detecting an obstacle with reflected ultrasonic waves for parking assistance for a vehicle, comprising:

transmitting, during a parking process for the vehicle, by an ultrasonic transmitter on the vehicle, an ultrasonic burst transmission signal to a detection area to be observed;

receiving, during the parking process for the vehicle, an ultrasonic signal reflected by an obstacle in the detection area by an ultrasonic receiver on the vehicle as an ultrasonic reception signal;

detecting at least one echo signal section that can be traced back to an obstacle in the ultrasonic reception signal resulting from the obstacle by comparing a signal amplitude to a threshold, wherein the threshold is varied over a time course of the ultrasonic reception signal;

extracting the detected echo signal section from the ultrasonic reception signal;

transforming the extracted echo signal section of the ultrasonic reception signal belonging to the echo from the time domain into the frequency domain to generate a frequency spectrum of the detected echo signal section;

examining the frequency spectrum of the extracted echo signal section for a presence of at least two of a plurality of predetermined spectral characteristics representative respectively of a predetermined obstacle type or a plurality of obstacle types; and allocating the extracted echo signal section to one of three predetermined obstacle types based on the examination of the frequency spectrum of the extracted echo signal section of the ultrasonic reception signal, wherein the at least two predetermined spectral characteristics include a spectral center of gravity and a spectral width of the frequency spectrum of the extracted echo signal section.

2. The method according to claim 1, wherein a degree of probability is specified with which the extracted echo signal section can be allocated to the obstacle type, or wherein a plurality of probabilities is specified with which the extracted echo signal section can be allocated to different respective obstacle types.

3. The method according to claim 1, wherein a detected obstacle is signalized optically and/or acoustically and/or tactilely, and wherein respective signals from the optical and/or acoustic and/or tactile signalization are different for predetermined obstacle types.

4. The method according to claim 1, wherein the pile can be one selected from a first set of a pile for information and traffic signs, a pile for traffic lights and a pile for street lights, and further wherein the post can be one selected from a second set of a post for information and traffic signs, a post for traffic lights and a post for street lights.

5. The method according to claim 1, wherein a sensitivity of the ultrasonic receiver is temperature-dependent, and wherein the detection of the detected echo signal section and the subsequent transformation of the extracted echo signal section into the frequency domain are temperature-compensated or temperature-corrected or otherwise carried out by taking into account a current temperature of the ultrasonic receiver.

6. The method according to claim 5, wherein the current temperature of the ultrasonic receiver is determined by measurement of the current temperature or based on a temperature-dependent signal characteristic of the ultrasonic reception signal.

7. The method according to claim 1, wherein the ultrasonic burst transmission signal comprises one to twenty pulses.

8. The method according to claim 1, wherein the ultrasonic burst transmission signal comprises five to fifteen pulses.

9. The method according to claim 1, wherein the ultrasonic burst transmission signal comprises eight to twelve pulses.

10. The method according to claim 1, wherein the transformation into the frequency domain is carried out by means of a Fourier transform, or by an algorithm from signal processing of a weather radar, such as an autocovariance procedure.

11. The method according to claim 1, wherein the allocation of the extracted echo signal section to the representative predetermined obstacle type is carried out based on classifiers or based on pattern recognition.

12. The method according to claim 1, wherein extracting the detected echo signal section from the ultrasonic reception signal includes:
   detecting the echo signal section maximum; and
   selecting samples to the left and to the right of the maximum.

13. The method of claim 12, wherein a same number of samples to the left and to the right of the maximum are selected.

14. The method of claim 1, wherein allocating the extracted echo signal section to one of three predetermined obstacle types is based only on the spectral center of gravity and the spectral width of the frequency spectrum of the extracted echo signal section.

15. The method of claim 14, wherein the three predetermined obstacle types comprise as a first type a curb and a bump, as a second type a wall and a vehicle, and as a third type a post and a pile.

16. The method of claim 1, wherein the ultrasonic transmitter and the ultrasonic receiver are a same transducer.

17. A method for detecting an obstacle with reflected ultrasonic waves for parking assistance for a vehicle, comprising:
   transmitting, during a parking process for the vehicle, by an ultrasonic transmitter on the vehicle, an ultrasonic burst transmission signal to a detection area to be observed;
   receiving, during the parking process for the vehicle, an ultrasonic signal reflected by an obstacle in the detection area by an ultrasonic receiver on the vehicle as an ultrasonic reception signal;
   detecting at least one echo signal section that can be traced back to an obstacle in the ultrasonic reception signal resulting from the obstacle by comparing a signal amplitude to a threshold, wherein the threshold is varied over a time course of the ultrasonic reception signal;
   determining both a distance and a type of the obstacle based on the detected echo signal section of the ultrasonic reception signal, wherein:
      the distance of the obstacle from the vehicle is determined based on a timing of detecting the detected echo signal section in the time domain; and
      the type of the obstacle is determined based only on a spectral center of gravity and a spectral width of the detected echo signal section analyzed in the frequency domain.

18. The method of claim 17, wherein the type of the obstacle is one of (a) a curb or a bump, (b) a wall or a vehicle, or (c) a post or a pile.

* * * * *